United States Patent [19]

Andersson

[11] 3,925,972
[45] Dec. 16, 1975

[54] LAWN MOWER WITH A SIDE OUTLET
[75] Inventor: Kjell Arne Andersson, Huskvarna, Sweden
[73] Assignee: Husqvarna AB, Huskvarna, Sweden
[22] Filed: June 14, 1974
[21] Appl. No.: 479,531

[52] U.S. Cl. .................... 56/320.2; 56/202; 56/255
[51] Int. Cl.² ......................................... A01D 67/00
[58] Field of Search .......... 56/202, 320.2, 255, 17.5

[56] References Cited
UNITED STATES PATENTS
| | | | |
|---|---|---|---|
| 3,220,170 | 11/1965 | Smith et al. | 56/255 |
| 3,404,519 | 10/1968 | Demers | 56/14.7 |
| 3,514,931 | 6/1970 | Solheim | 56/255 |

FOREIGN PATENTS OR APPLICATIONS
| | | | |
|---|---|---|---|
| 106,617 | 7/1965 | Norway | 56/320.2 |

Primary Examiner—Russell R. Kinsey
Attorney, Agent, or Firm—Holman & Stern

[57] ABSTRACT

A rotary lawn mower arrangement which reduces the risks of injury from thrown objects by providing two flaps pivoting towards each other, located at the forward and rearward edges of the side outlet and an edge turned upwardly and defining the height of the outlet in the forward portion. The flaps and the upwardly turned edge prevent stones thrown by the rotor from passing through the outlet but allow the cut grass and air to pass therethrough.

1 Claim, 4 Drawing Figures

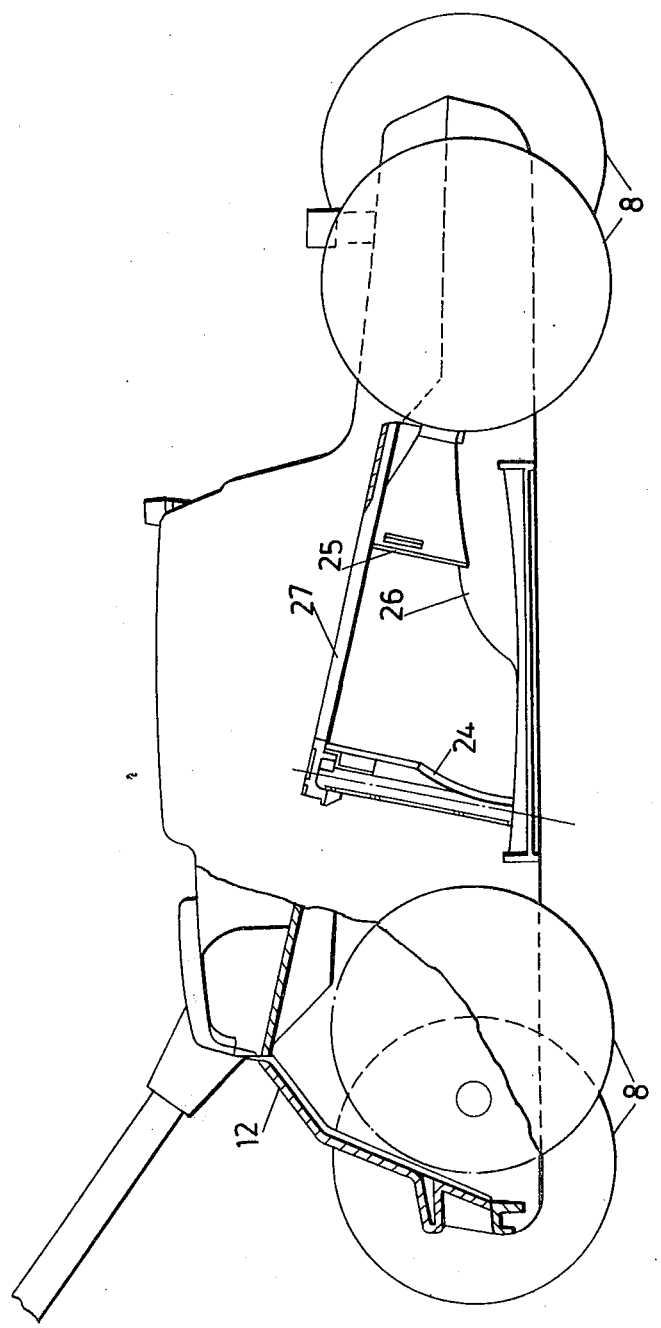

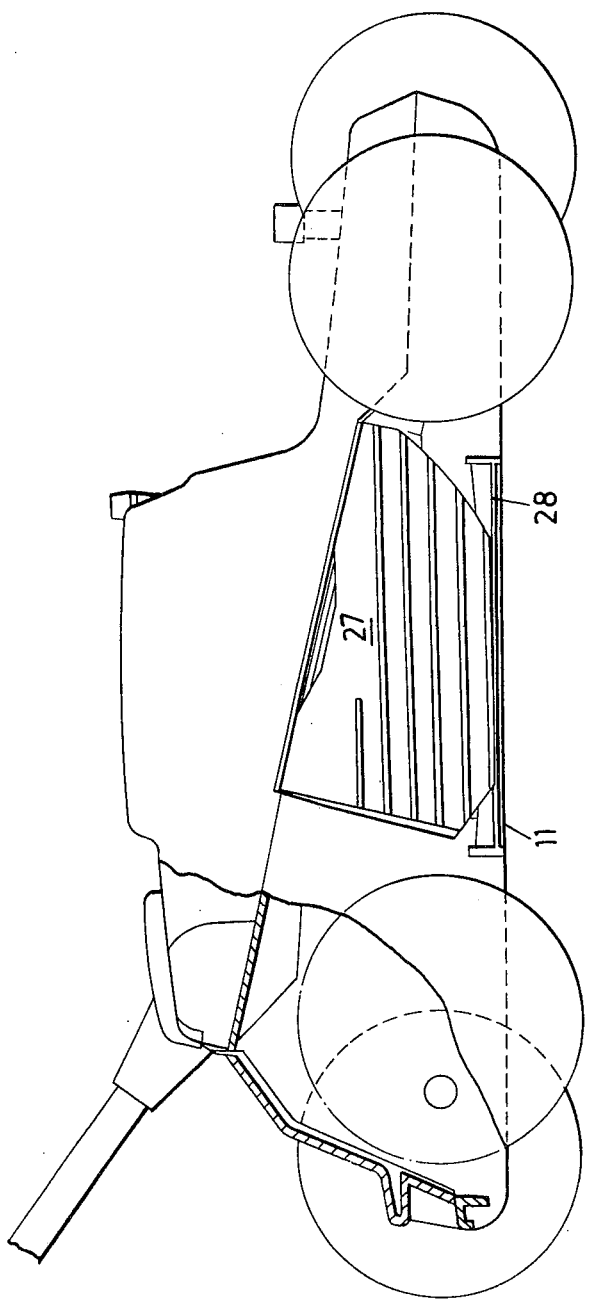

LAWN MOWER WITH A SIDE OUTLET

BACKGROUND OF THE INVENTION

The present invention relates to rotary lawn mowers of the type to which a grass collecting box can be removably attached. In addition to its main function of collecting grass, such a box when fitted, serves to protect the user against possible injury from objects picked up by the rotary blades of the mower and thrown forcibly therefrom.

It is previously known with rotary lawn mowers of the type envisaged to design the cutting blade rotor in a manner to produce a blowing effect therearound, this blowing effect being enhanced by giving the rotor housing the form of a volute with an outlet for the flow of air together with cut grass on one side of the mower. Such an arrangement, however, is encumbered with the disadvantage that stones and other objects picked up by the cutting blades may be thrown forcibly out through the outlet, in a direction such that they can readily cause injury to the user. This disadvantage can be overcome to some extent by fitting a grass collecting device over the outlet. In many instances, however, it is desirable to operate the lawn mower without the grass collecting device fitted, for example when it is desired to leave the cut grass strewn on the lawn. To enable the mower to be operated without a collecting device whilst still protecting the user against injury by flying stones etc., there must be provided a device which serves as a shield against stones which may be slung by the rotor. It is important, however, that the flow of air created by the rotor is maintained, so that the cut grass is removed from the working region of the rotor, otherwise the cut grass is liable to be re-drawn into the rotor and cut into small pieces, to be finally ejected in agglomerated form beneath the casing of the mower; this was a normal occurrence with the older types of rotary machines. A directed, well-defined stream of air and grass from the surroundings of the rotor eliminates this disadvantage.

BRIEF SUMMARY OF THE INVENTION

An object of the invention is to provide means for guiding said air flow, on the one hand with a grass collecting box fitted and on the other hand with the box removed, so that all cut grass leaves the rotor housing through the outlet of the volute housing or through a side outlet, from where it is delivered to the container or is ejected to one side of the mower.

Accordingly, the invention consists in a rotary lawn mower having a chassis supported on wheels and a motor-driven cutting blade rotor arranged in a rotor housing formed in the chassis, said rotor housing being open at the bottom thereof and having a height which increases successively around the motor, wherein a side outlet for cut grass is arranged on one side of the rotor housing, wherein located adjacent said opening are two pivotable covers which can be pivoted relative to each other to cover and to expose said opening; and wherein the rotor housing wall at the forward portion of the outlet has an edge portion which extends upwardly in said outlet, and which defines the height of said outlet at said forward portion.

The function of the flap is two-fold since, when using the collecting box, it serves to close the side outlet, while when said outlet is open it serves as a stone shield.

So that the invention will be more readily understood and further features thereof made apparent, an embodiment of a lawn mower according to the invention will be described in the following with reference to the accompanying drawing, in which

BRIEF DESCRIPTION OF THE DRAWINGS

FIG. 3 is a side view of the mower with an open side outlet; and

FIG. 4 is the same view as in FIG. 3 with the side outlet closed.

DETAILED DESCRIPTION OF A PREFERRED EMBODIMENT

Figure 1:
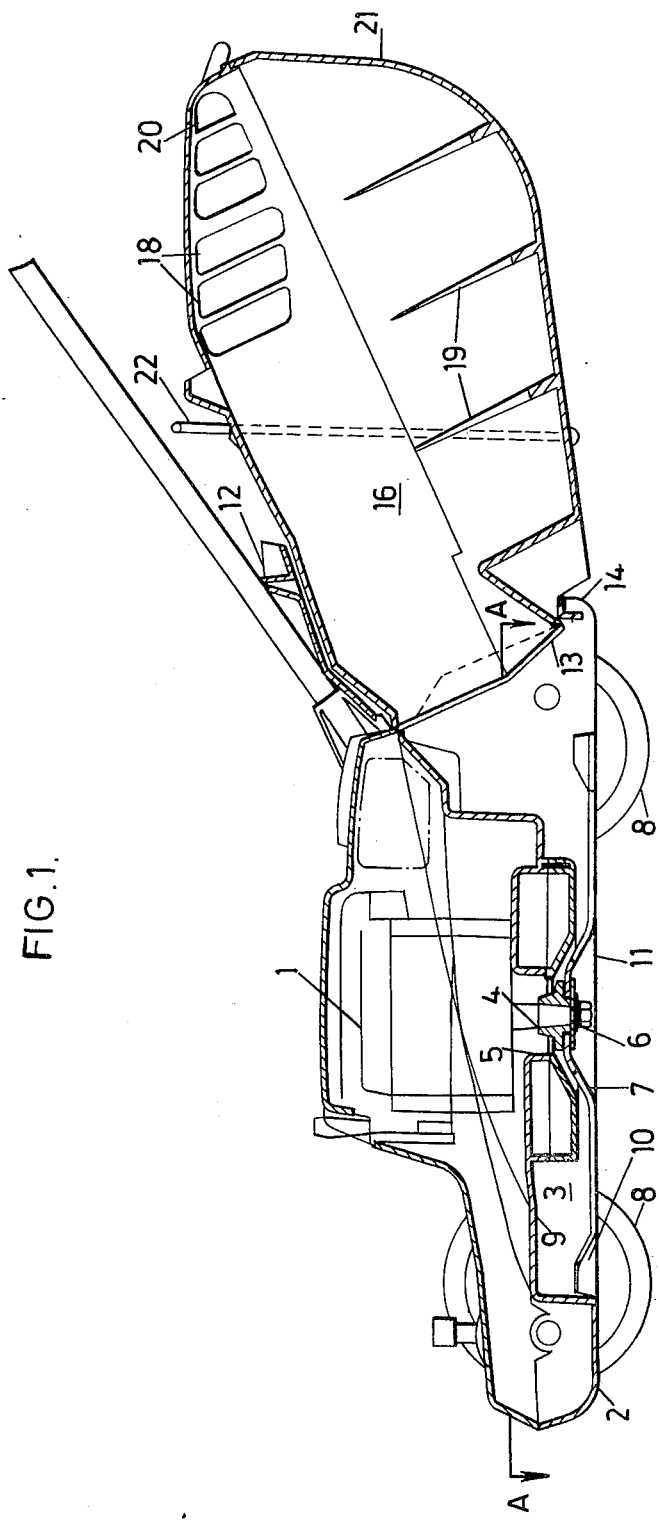
FIG. 1 is a longitudinal sectional view of a conventional lawn mower with a grass collecting box fitted thereon.

The illustrated conventional lawn mower comprises, in a known manner, an internal combustion engine 1, which is shown diagrammatically in the drawing and which is mounted in a chassis 2, which has at the bottom thereof a rotor housing 3, in the form of a volute. The engine 1 has an output shaft 4 which passes through the chassis in a central opening 5 and which is terminated at the bottom thereof with an attachment means 6 for a cutting blade rotor 7. The chassis is supported on four wheels 8 which are suspended in a linkage system in a conventional manner so as to enable vertical adjustment of the rotor. The distance between the rotory plane of the rotor and the upper defining wall 9 of the volute increases successively from a small height above said plane on the left side of the machine as seen in FIG. 1, to a much greater height at the outlet of the volute at the rear portion of the machine. At the its free end portions, the rear edge of respective cutting blades is bent upwardly to form an air-current forming wing 10. Upon rotation of the blade, a strong air flow is created, so that air is drawn in beneath the lower edge 11 of the volute and is caused to eddy round in the volute and to leave the same through the outlet at the rear of the mower shown in FIG. 1. The front edges of the cutting blades have a cutting edge which will clip the grass at a height level with the rotary plane of the blades.

Arranged in the rear portion of the machine is an upwardly pivotable flap 12, which in a collapsed position covers an opening 13 in the rear wall 14 of the machine. When the flap 12 is lifted to the position shown in FIG. 1, a grass collecting box 16 can be placed against the opening 13 and hooked firmly by means of a latching means (not shown) located at the rear edge of the flap 12. The air flow from the volute will now pass directly into the box, which has openings 18 on the upper side thereof, the air continuing out through said openings whilst the grass falls down onto the bottom of the container. The bottom is provided with swung cross-ribs 19, which keep the grass distributed over the entire length of the container.

The box is made from moulded plastics in two mutually connectable parts 20, 21, the two box parts being held together by a pivotable yoke 22 as shown in FIG. 1. When the box is to be emptied, the latching means is released, whereafter the box is removed from the machine. The yoke is then moved out of its latching position and the box parts separated. When the box is removed from the machine, the flap 12 will close automatically, and is locked in the closed position, so that the mower is not driven with the flap open.

As before-mentioned, such a lawn mower is of conventional design, and is known from Swedish patent application No. 145007/71. The utility of the mower can be enhanced, however, by providing a side outlet complementary to the flap 12 at the rear of the mower. Such a side outlet is shown at 23 in FIGS. 2–4 in both the open (FIGS. 2–3) and the closed (FIG. 4) position, through which outlet a mixture of air and grass is able to leave the rotor housing.

Figure 2:
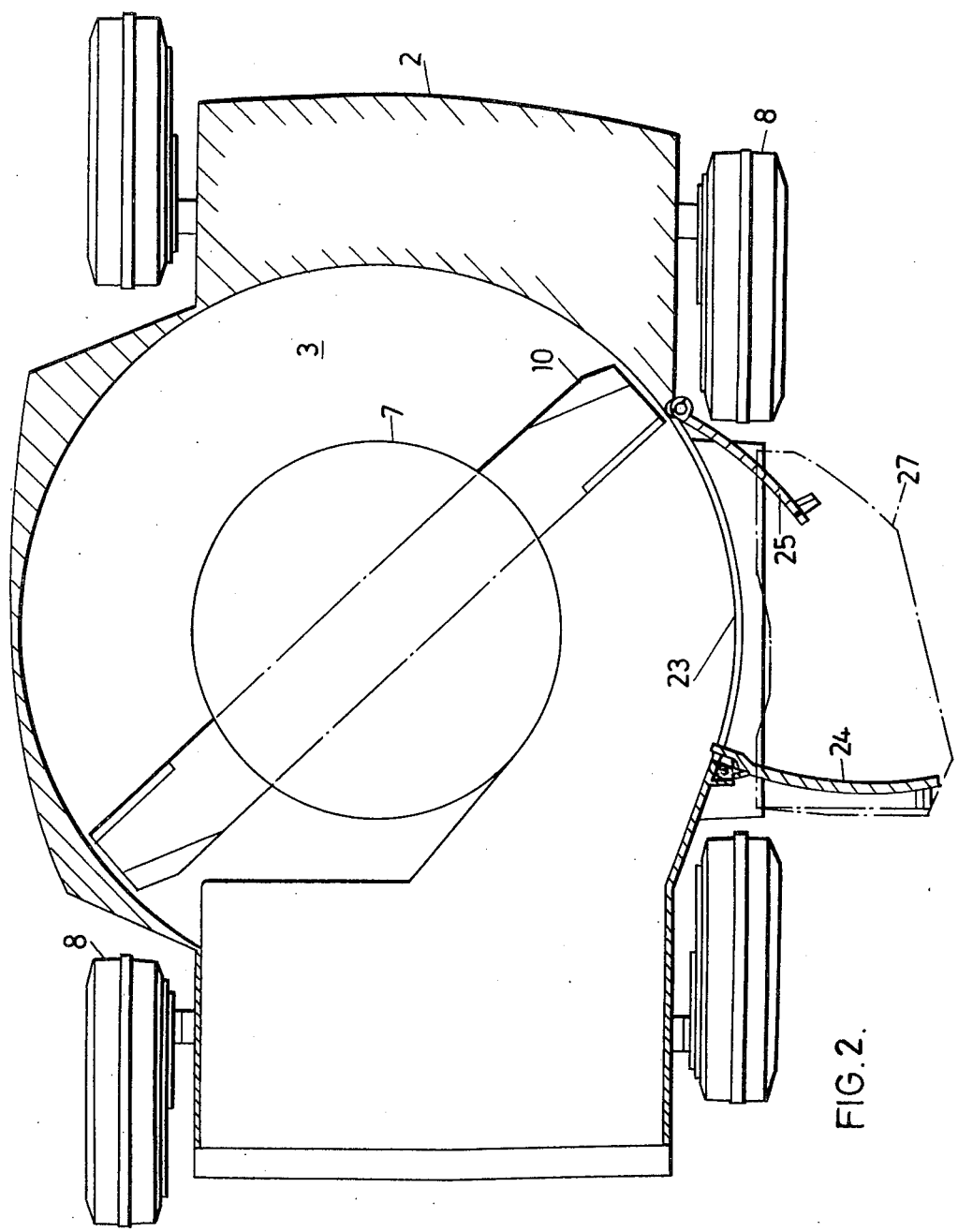
FIG. 2 is an enlarged horizontal sectional view taken substantially along lines A—A, of FIG. 1, through the volute housing of the mower of FIG. 1 and shows the provision of a flap complementary to the outlet of said mower.

As mentioned in the introduction, there is a risk of objects, such as stones, struck by the cutting blades being flung from the rotor housing through such a side outlet, with the embodiment of FIGS. 2–4, this risk is greatly eliminated by the arrangement of two flaps 24, 25, which are pivotally mounted at the wall of the volute. The flaps can be opened to the maximum extent shown in FIG. 2. Any object which is struck by the rotating cutting blades will be thrown tangentially from the movement path of the blades. It is impossible, however, to draw the tangent from this path through the opening 23 without meeting one of the flaps 24, 25, and hence normally no stone can be thrown from the cutting blades through the opening. However, an extra safety margin is obtained if the wall of the volute at the opening is given the configuration shown in FIG. 3, i.e. if there is provided at the front of the opening an upwardly turned wall edge 26, which prevents stones from passing through the opening but which allows grass and air to pass therethrough.

The shape of the flaps conforms with the shape of the opening; this provides a completely tight sealing of the opening, which sealing is additionally enhanced by a cover plate 27 which is dropped over the flap from above in closed position (see FIG. 4). This plate also serves to lock the flaps, and is arranged to be pressed against said flaps and hooked onto a strip member 28 located at the under edge of the volute housing.

The aforedescribed side outlet with the safety flaps 24, 25 provides an important improvement to rotary lawn mowers of the type envisages, and a lawn mower fitted with such an outlet widens the range of available lawn mowers, providing for greater selectivity.

What I claim is:

1. A rotary lawn mower comprising:
   a chassis;
   wheels supporting said chassis;
   a rotor housing formed in said chassis;
   a cutting blade rotatably supported in housing;
   a motor means operatively associated with said blade for rotating same;
   said rotor housing having an open bottom, having a height increasing successively around said motor means, and portions of said housing defining a side outlet for expulsion of cut grass including front, rear, upper and lower edges;
   a pair of flap members pivotably attached respectively to said front and rear edges of said outlet and movable between a closed position in which they cover said outlet and an opened position in which they expose said outlet, said flap members being restricted in their movement away from said outlet to form a shield in their opened position against objects which are thrown by said blade through said outlet;
   a cover plate hingedly attached to said upper edge of said outlet for locking said flap members in their closed position; and
   said lower edge extending upwardly over the forward portion of said outlet limiting the height of said outlet at said forward portion relative to the height of said outlet at the rearward portion thereof.

* * * * *